J. T. WILSON.
COMBINED HOE AND WEED CUTTER.
APPLICATION FILED OCT. 27, 1910.
1,000,473.
Patented Aug. 15, 1911.
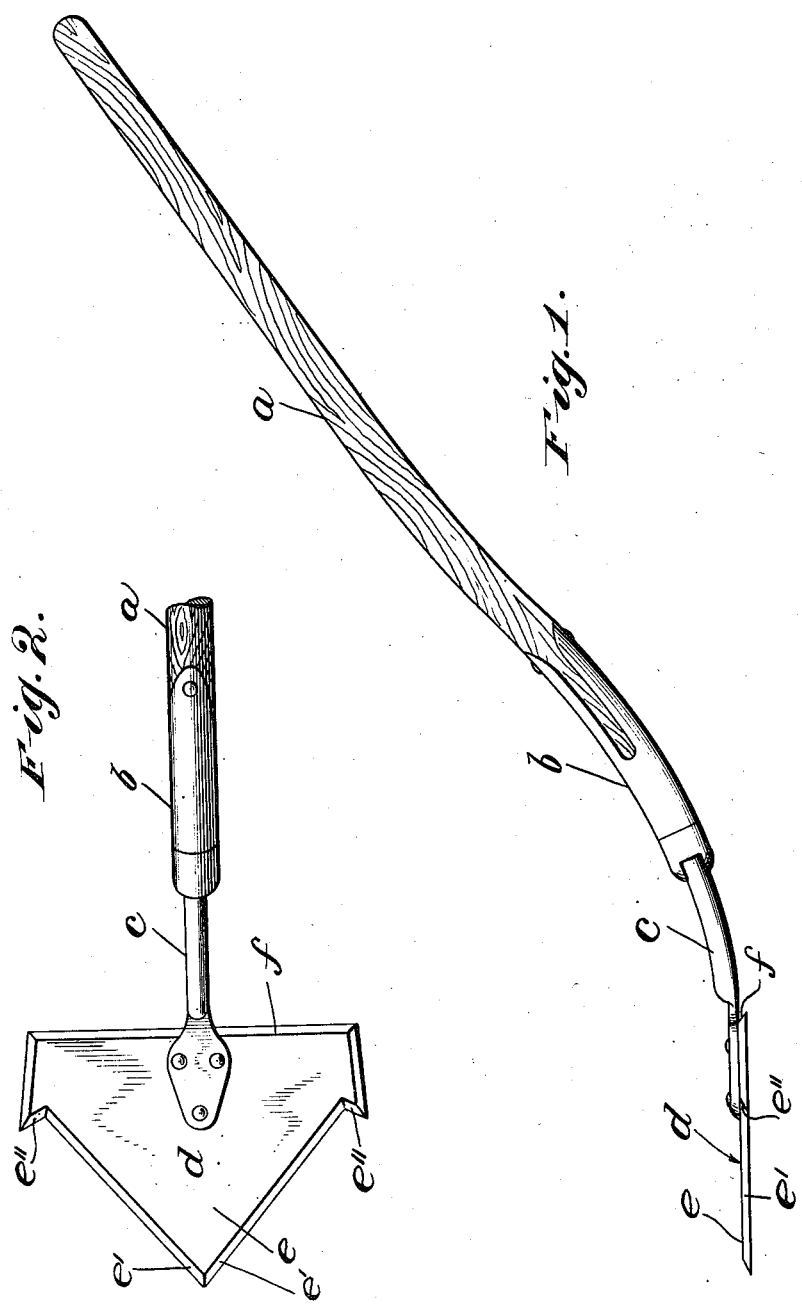

UNITED STATES PATENT OFFICE.

JOHN T. WILSON, OF ABILENE, KANSAS.

COMBINED HOE AND WEED-CUTTER.

1,000,473.   Specification of Letters Patent.   Patented Aug. 15, 1911.

Application filed October 27, 1910. Serial No. 589,409.

*To all whom it may concern:*

Be it known that I, JOHN T. WILSON, a citizen of the United States, residing at Abilene, in the county of Dickinson and State of Kansas, have invented certain new and useful Improvements in Combined Hoes and Weed-Cutters, of which the following is a specification, reference being had to the accompanying drawings.

This invention relates to improvements in combined hoe and weed cutters; and an object of this invention is to provide an implement of this character which will be simple in construction, comparatively cheap in manufacture and most efficient in use.

In the drawings illustrating the principle of this invention and the best mode now known to me of applying that principle, Figure 1 is a side elevation of my new combined hoe and weed cutter; Fig. 2 is a plan view of the same.

On the lower end of the wooden handle *a* is fitted the socket-member *b*, from which extends the shank *c*. The latter is fastened to the cutting plate *d*. The toe end *e* of the latter is triangular in shape, and the edges *e'* which converge in a point are sharpened for the purpose of adapting the plate to cut. At its sides (which are also sharpened) and near the base ends of the cutting edges *e'* the plate is formed with edged projections *e''*, one side of each of which makes with the adjacent cutting edge *e'* substantially a right-angle. The base end of the plate is formed with a cutting edge *f*, so that the plate will cut when drawn toward the operator as well as when pushed away from him.

It is obvious that by giving the implement a half turn from its position shown in Fig. 1, it may be used as a hoe; and the implement may even be used as a spade for turning the soil.

I claim:

The herein-described combined hoe and weed-cutter consisting of a handle and a plate fastened thereto, the latter having a V-shaped point the edges of which are cutting edges; said plate being formed at the base end of each of said edges with a cutting tooth one side of which makes substantially a right angle with the adjacent cutting edge and the other side of which is in prolongation of a side of said plate near the base thereof; said plate having its transverse edge and its sides at its base sharpened to form cutting edges; and said plate and handle being set at an angle to each other, whereby the implement may be used as a hoe or a spade.

In witness whereof I hereunto set my hand at Abilene, Kansas, this 22nd day of October, 1910, in the presence of the two undersigned witnesses.

JOHN T. WILSON.

Witnesses:
  J. G. SCHUTZ,
  M. E. CUTHBERT.